US00RE44557E

(19) United States
(12) Reissued Patent
Domes

(10) Patent Number: US RE44,557 E
(45) Date of Reissued Patent: *Oct. 22, 2013

(54) RUGGEDIZED TRADESWORKERS RADIO

(75) Inventor: Joseph Domes, Huntington, NY (US)
(73) Assignee: Black & Decker Inc., Newark, DE (US)

( * ) Notice: This patent is subject to a terminal disclaimer.
(21) Appl. No.: 13/403,447
(22) Filed: Feb. 23, 2012

Related U.S. Patent Documents

Reissue of:
(64) Patent No.: 7,043,283
Issued: May 9, 2006
Appl. No.: 10/758,492
Filed: Jan. 15, 2004

U.S. Applications:
(63) Continuation of application No. 10/215,657, filed on Aug. 10, 2002, now Pat. No. 6,788,925, which is a continuation of application No. 09/963,356, filed on Sep. 25, 2001, now Pat. No. 6,456,837, which is a continuation of application No. 09/209,721, filed on Dec. 11, 1998, now Pat. No. 6,308,059.

(60) Provisional application No. 60/069,372, filed on Dec. 12, 1997.

(51) Int. Cl.
*H04M 1/00* (2006.01)
*H04B 1/00* (2006.01)

(52) U.S. Cl.
USPC ... 455/575.1; 455/66.1; 455/90.1; 455/343.1; 455/351; 320/112; 320/114

(58) Field of Classification Search
None
See application file for complete search history.

(56) References Cited

U.S. PATENT DOCUMENTS

D91,497 S 2/1934 Raffetto
2,058,407 A 10/1936 Brown (Continued)

FOREIGN PATENT DOCUMENTS

DE 1136764 9/1962
DE 1171524 6/1964

(Continued)

*Primary Examiner* — Lee Nguyen
(74) *Attorney, Agent, or Firm* — Harness, Dickey & Pierce, P.L.C.

(57) ABSTRACT

A tradesworker's radio has a weather and impact resistant features to enable a tradesworker to use the radio under adverse working conditions, such as construction or other work sites. Louvered grills covering moisture resistant loudspeakers are angled downward to protect the speakers from direct splash in case the radio is left outdoors in a heavy downpour. A layer of felt-like material is interspersed between the louvered grills and the loudspeaker cones to offer improved moisture resistance. A non-telescoping antenna of the rubber covered spring type material folds neatly into recess when not in use. The controls include waterproof push-buttons for on/off, volume adjustment, a weather channel, AM/FM selection and tuning. Elastomeric blocks are bonded to the interior of the housing and the blocks have bonded threaded studs, which are used to shock mount the radio circuit board to the inside of the housing. This circuit board is treated with a conformal coating to improve its moisture resistance. The preferred housing material is a layer of rigid plastic, which is impact resistant and the outer covering is a resilient tough elastomer. The radio can be used with an adapter to convert to a power hand tool battery pack to accommodate a variety of different battery packs and adapters. The battery compartment is generous in size and lined with a soft polyurethane material to protect the battery pack from damage.

29 Claims, 4 Drawing Sheets

(56) References Cited

U.S. PATENT DOCUMENTS

| | | | | | |
|---|---|---|---|---|---|
| 2,501,689 | A | | 3/1950 | Peterson | |
| 2,803,372 | A | | 8/1957 | Lee | |
| 3,124,266 | A | | 3/1964 | Morgan | |
| 3,458,794 | A | | 7/1969 | Bohnstedt et al. | |
| 3,506,902 | A | * | 4/1970 | Sullivan | 320/106 |
| 3,698,780 | A | | 10/1972 | Collins et al. | |
| 3,813,004 | A | | 5/1974 | Andreaggi | |
| 3,971,889 | A | | 7/1976 | Hays | |
| 3,984,645 | A | | 10/1976 | Kresch | |
| 4,006,764 | A | | 2/1977 | Yamamoto et al. | |
| 4,045,663 | A | | 8/1977 | Young | |
| 4,050,493 | A | | 9/1977 | Cho | |
| 4,089,044 | A | | 5/1978 | Gatto | |
| 4,196,821 | A | | 4/1980 | Teti et al. | |
| 4,203,636 | A | | 5/1980 | Wells | |
| 4,213,532 | A | | 7/1980 | Eggert et al. | |
| 4,225,970 | A | | 9/1980 | Jaramillo et al. | |
| 4,274,545 | A | | 6/1981 | Peroni | |
| 4,279,342 | A | | 7/1981 | Van Felt | |
| 4,395,619 | A | | 7/1983 | Harigai | |
| 4,424,006 | A | | 1/1984 | Armbruster | |
| 4,456,315 | A | | 6/1984 | Markley et al. | |
| 4,480,809 | A | | 11/1984 | Healey | |
| 4,504,774 | A | | 3/1985 | Hoffman | |
| 4,586,115 | A | | 4/1986 | Zimmerman et al. | |
| 4,641,370 | A | | 2/1987 | Oyamada | |
| 4,709,201 | A | | 11/1987 | Schaefer et al. | |
| D296,243 | S | | 6/1988 | Ohashi | |
| 4,756,454 | A | | 7/1988 | Villanueva et al. | |
| 4,761,813 | A | | 8/1988 | Gammel | |
| 4,817,191 | A | | 3/1989 | Adams | |
| 4,870,702 | A | | 9/1989 | Azzouni | |
| 4,913,318 | A | | 4/1990 | Forrester | |
| 4,937,806 | A | | 6/1990 | Babson et al. | |
| 4,939,912 | A | | 7/1990 | Leonovich, Jr. | |
| D310,529 | S | | 9/1990 | Yuen | |
| 4,961,994 | A | | 10/1990 | Cariou et al. | |
| 5,001,779 | A | | 3/1991 | Eggert et al. | |
| 5,090,562 | A | | 2/1992 | Grullemans | |
| 5,091,732 | A | | 2/1992 | Mileski et al. | |
| 5,159,712 | A | | 10/1992 | Schneider et al. | |
| 5,164,830 | A | | 11/1992 | Kim | |
| 5,170,851 | A | | 12/1992 | Kress et al. | |
| 5,172,043 | A | * | 12/1992 | Toops | 320/106 |
| 5,193,220 | A | | 3/1993 | Ichinohe et al. | |
| 5,220,269 | A | | 6/1993 | Chen et al. | |
| 5,280,651 | A | | 1/1994 | Lenihan et al. | |
| D348,464 | S | | 7/1994 | Peersmann | |
| 5,360,108 | A | | 11/1994 | Alagia | |
| 5,400,088 | A | | 3/1995 | Jones | |
| 5,404,419 | A | | 4/1995 | Artis, Jr. | |
| 5,408,382 | A | | 4/1995 | Schultz et al. | |
| 5,424,725 | A | | 6/1995 | Wandt et al. | |
| 5,489,484 | A | * | 2/1996 | Wheeler et al. | 429/98 |
| 5,572,592 | A | | 11/1996 | Muckelrath | |
| 5,587,562 | A | | 12/1996 | Sato | |
| 5,606,241 | A | | 2/1997 | Patino et al. | |
| 5,608,806 | A | | 3/1997 | Hinojosa | |
| 5,633,096 | A | | 5/1997 | Hattori | |
| 5,669,323 | A | | 9/1997 | Pritchard | |
| 5,680,026 | A | | 10/1997 | Lueschen | |
| D388,092 | S | | 12/1997 | Coppola | |
| 5,771,305 | A | | 6/1998 | Davis | |
| 5,810,168 | A | | 9/1998 | Eggering | |
| 5,945,806 | A | * | 8/1999 | Faulk | 320/127 |
| D418,836 | S | | 1/2000 | Matt et al. | |
| 6,127,797 | A | | 10/2000 | Walker | |
| 6,215,276 | B1 | | 4/2001 | Smith | |
| 6,230,029 | B1 | | 5/2001 | Hahn et al. | |
| 6,308,059 | B1 | * | 10/2001 | Domes | 455/351 |
| 6,427,070 | B1 | * | 7/2002 | Smith | 455/343.6 |
| 6,496,688 | B2 | * | 12/2002 | Smith | 455/343.6 |

FOREIGN PATENT DOCUMENTS

| | | | |
|---|---|---|---|
| DE | 1463443 | | 1/1969 |
| DE | 1665772 | | 1/1971 |
| DE | 2036476 | | 1/1972 |
| DE | 7342534 | | 3/1974 |
| DE | 7434554 | | 1/1975 |
| DE | 2741371 | | 3/1976 |
| DE | 2549356 | | 8/1976 |
| DE | 7710055 | | 7/1977 |
| DE | 3016551 | | 12/1980 |
| DE | 8404395 | | 7/1984 |
| DE | 3323624 | | 1/1985 |
| DE | 8905589 | | 8/1989 |
| DE | 3916400 | | 9/1990 |
| DE | 4033909 | | 7/1992 |
| DE | 4106557 | | 9/1992 |
| DE | 4340007 | | 6/1994 |
| DE | 9404473 | | 6/1994 |
| DE | 4405391 | | 9/1994 |
| DE | 4318011 | | 12/1994 |
| DE | 9413374 | | 2/1996 |
| DE | 2752385 | | 1/1997 |
| DE | 69803432 | T | 8/2002 |
| EP | 310717 | | 4/1989 |
| EP | 0509284 | | 10/1992 |
| EP | 716460 | | 12/1996 |
| EP | 920062 | | 6/1999 |
| JP | 50133804 | U | 10/1975 |
| JP | 52-112705 | | 8/1977 |
| JP | 52112705 | U | 9/1977 |
| JP | 61197646 | | 9/1986 |
| JP | 62178632 | U | 8/1987 |
| JP | 2063587 | U | 3/1990 |
| JP | 2084490 | U | 3/1990 |
| JP | 40007852 | B | 2/1992 |
| JP | 4150728 | | 5/1992 |
| JP | 5031378 | U | 2/1993 |
| JP | 6005232 | U | 1/1994 |
| JP | 6268548 | | 9/1994 |
| JP | 7-193444 | | 7/1995 |
| JP | 7307580 | | 11/1995 |
| JP | 8185893 | | 7/1996 |
| JP | 8195191 | | 7/1996 |
| JP | 8308113 | | 11/1996 |
| JP | 9004715 | | 1/1997 |
| JP | 9051281 | | 2/1997 |
| JP | 9200974 | | 7/1997 |
| JP | 52150005 | | 12/1997 |
| WO | WO 97/43921 | A | 11/1997 |

* cited by examiner

RUGGEDIZED TRADESWORKERS RADIO

Matter enclosed in heavy brackets [ ] appears in the original patent but forms no part of this reissue specification; matter printed in italics indicates the additions made by reissue.

CROSS-REFERENCE TO RELATED APPLICATIONS

The present application is a continuation of U.S. application Ser. No. 10/215,657, filed on Aug. 10, 2002, now U.S. Pat. No. 6,788,925, which is in turn a continuation of U.S. application Ser. No. 09/963,356, filed on Sep. 25, 2001, now U.S. Pat. No. 6,456,837, which is in turn a continuation of U.S. application Ser. No. 09/209,721, filed on Dec. 11, 1998, now U.S. Pat. No. 6,308,059, which in turn derives priority from U.S. Provisional Patent Application No. 60/069,372, filed on Dec. 12, 1997.

FIELD OF THE INVENTION

The present invention relates to durable, rugged radios for tradesworker in construction and other worksites.

BACKGROUND OF THE INVENTION

Tradespersons working at construction sites regularly use portable radios for entertainment and to obtain weather reports. However, these radios lack certain features that would be desirable for such use. Small radios often lack the power desirable for overcoming ambient noise of other workers or to carry the sound over long distances outdoors. Although "boom boxes" may have the desired power output, they lack the ruggedness and splash proofing that is desirable. Other features, such as the convenient use of rechargeable batteries, are missing as well.

The prior art relates to some of these shortcomings. U.S. Pat. No. 4,006,764 of Yamamoto et al. relates to a protection case that can be used to enclose a tape recorder or radio to protect it from water spray or dust without seriously impeding sound transmission. U.S. Pat. No. 4,709,201 of Schaefer et al. discloses a modular battery pack with an on/off switch and contacts arranged for various modes of operation. U.S. Pat. No. 4,225,970 of Jaramillo et al. relates to a splash proof portable two-way data terminal/radio. It describes the use of tongue-in-groove elastomeric gaskets in the housing assembly as well as air-permeable water resistant material to achieve its results.

Other prior art include U.S. Pat. No. 5,572,592 of Muckelrath, which describes a field remote control radio transmitter/receiver which includes a weather resistant enclosure. U.S. Pat. No. 5,164,830 of Kim discloses a radio receiver which integrates a weather channel therein. U.S. Pat. No. 5,091,732 of Mileski and U.S. Pat. No. 4,761,813 of Gammel describe field oriented military radio systems. U.S. Pat. No. 4,961,994 of Cariou describes a waterproof coating material.

Shock-mounts for mounting delicate objects are described in U.S. Pat. Nos. 4,395,619 and 4,395,619, both of Harigai and U.S. Pat. No. 4,586,115 of Zimmerman. Retractable electric cords are disclosed in U.S. Pat. No. 3,984,645 of Kresch. Moreover, portable radios are described in general in U.S. Pat. No. 4,913,318 of Forrester.

OBJECTS OF THE INVENTION

It is an object of this invention to provide a radio with improved impact resistance.

It is a further object to provide a radio that has a built-in retractable line cord for operation from an AC supply.

It is yet another object to be able to power the radio with modular batteries normally used in professional portable power tools.

It is a further object to be able to recharge the batteries with a built-in recharger while simultaneously powering the radio from an AC supply.

It is yet another object to provide a splash proof radio.

It is another object to include a switch-selectable weather band tuned to the National Weather Service.

SUMMARY OF THE INVENTION

In keeping with those objects and others which may become apparent, the present invention includes a durable portable radio for tradesworkers with a weather and impact resistant enclosure having an exterior surface and an interior space. The enclosure houses a radio receiver for receiving radio signals and generating electronic audio output signals responsive thereto.

The enclosure of the radio is preferably made of a shock and water resistant solid elastomer, such as acrylonitrile butadiene styene (ABS). The exterior surface of the radio enclosure has a plurality of planar surfaces, wherein a foldable antenna is insertable within a recess extending below one planar surface of the plurality of surfaces.

A handle is formed from a slot extending through a pair of opposite planar surfaces of the radio, and a ventilation opening extends from the interior space of said radio.

The weather and impact resistant enclosure includes one or more downward angled louvered grills covering one or more moisture resistant loudspeakers.

The weather and impact resistant enclosure includes a moisture resistant sound transmitter insulating layer between the louvered grill and the loudspeaker.

A plurality of waterproof push buttons control on/off control, volume adjustment, AM/FM section an optional weather channel and frequency tuning.

To prevent moisture buildup, the weather and impact resistant enclosure includes a hydrophobic air permeable therein.

The radio is powered by either a first power source including an electrical cord engageable with an electrical outlet, or a second power source including an adapter engageable with a secondary direct current power source, such as a tradesworker's hand tool battery pack.

The first power source includes a retractable line cord, which is retractable within a subhousing enclosure within the radio.

The radio receiver is shock mounted to an interior wall of the weather and impact resistant enclosure by a plurality of elastomeric blocks bonded to the interior wall of the weather and impact resistant housing enclosure. The radio receiver itself is preferably coated with a moisture resistant conformed coating, such as acrylic or paralyene.

One or more watertight formed-in-place gaskets seal openings within the weather and impact resistant enclosure.

The alternate DC power source may include a battery pack having a voltage of between about 9.6 to about 18 volts, preferably about 12 volts.

The secondary DC power source may optionally include a combination power supply and battery charger supplied with 115 VAC, which supplies about 13.6 volts through a diode and a switch to the radio receiver. A button causes the power supply to supply voltage through the diode, and the diode feeds current from the power supply to the radio receiver.

Alternately, a plurality of diodes may act as an automatic steering and isolation network to supply either AC supplied current, battery power or simultaneous power and battery charging from AC power.

An optional variable voltage feature permits use of battery packs lower or higher than 12 volts to be used by the radio. The variable voltage feature includes a socket having a plurality of contacts mating with an adapter, matching predetermined requirements of a DC source battery pack, and a double pole single throw on/off switch controlling a DC/DC power source converter for supplying power to said radio.

As a result, the radio provides a tradesworker with a rugged, durable radio to provide audio entertainment and news under adverse working conditions.

BRIEF DESCRIPTION OF THE DRAWINGS

The present invention can best be described in conjunction with the following drawings, in which.

DETAILED DESCRIPTION OF THE INVENTION

Figure 1:
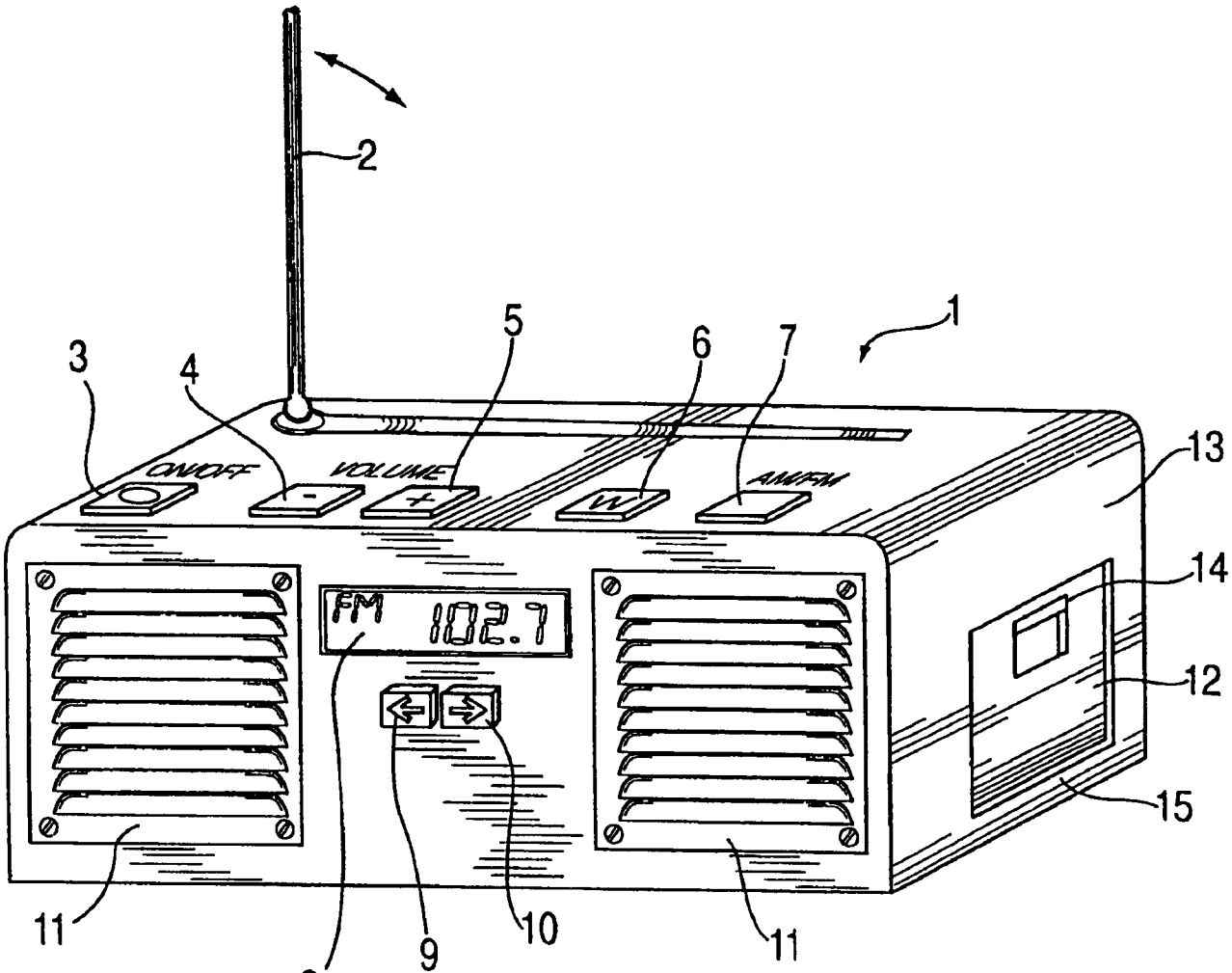
FIG. 1 is a perspective view of the tradesman's radio of the present invention.

FIG. 1 shows the tradesman's radio 1. Housing 13 is a molded plastic structure, although alternate rugged materials such as aircraft aluminum can be used. Stainless steel louvered grills 11 cover the moisture resistant loudspeakers. Louvered grills 11 are angled downward to protect the speakers from direct splash in case radio 1 is left outdoors in a heavy downpour.

A layer of felt-like material such as described in Jaramillo et al. U.S. Pat. No. 4,225,970 can be interspersed between the louvered grills 11 and the loudspeaker cones to offer improved moisture resistance. An example of such material which allows good sound transmission while blocking moisture is known as NB-25, manufactured by Nu-Way Speaker Products, Inc.

Non-telescoping antenna 2 is of the rubber covered spring type material; it folds neatly into recess 3 when not in use. The controls include waterproof pushbuttons for on/off 3, volume adjustment 4 & 5, weather channel 6, AM/FM selection 7 and tuning 9 & 10. The digital tuning display 8 is either a self-illuminating vacuum fluorescent display or an LCD backlighted by an electro-luminescent back light panel. Both of these technologies are common in automotive radio applications. Side door 12 with piano hinge 15 and slide latch 14 provide access to the retractable cord. A similar door (not shown) on the other side provides access to the battery compartment. Both doors are sealed watertight with appropriate gaskets.

Figure 2:
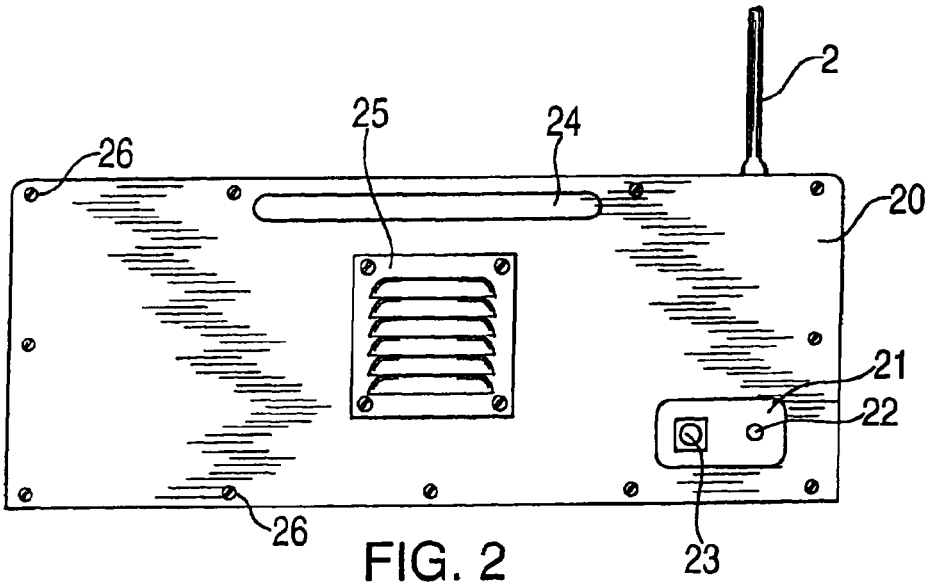
FIG. 2 is a view of the rear panel of the radio as in FIG. 1.

FIG. 2 shows back panel 20 of radio 1. Back panel 20 is screwed to housing 13 with screws 26. Slot 24 is a hand recess for carrying radio 1. Small stainless steel louver 25 is a vent to prevent moisture buildup within radio housing 13. Louver 25 covers an opening in cover 20 that has a layer of hydrophobic air-permeable material such as Tyvek made by the DuPont Company. Other such materials of different composition are often used in medical applications; these may be used here as well.

Waterproof button 23 turns on the battery charger, indicator 22 lights up during charging operations. Both of these are accessible through opening 21.

Figure 3:
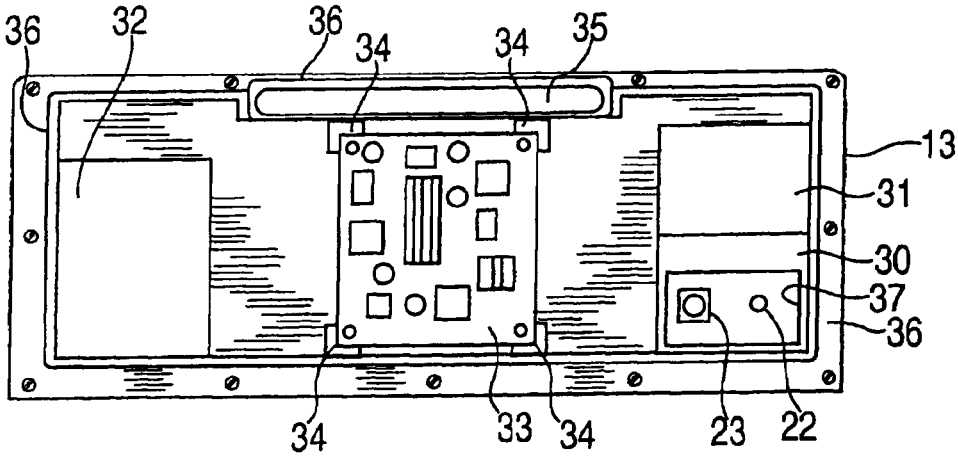
FIG. 3 is a back view of the radio as in FIG. 1 with the rear panel removed.

FIG. 3 shows the interior of housing 13 when back panel 20 is removed. Retractable line cord housing 32 is at the left. Battery compartment 31 is at the right atop charger housing 30. Molded recess 35 communicates with the hand hold slot in back cover 20.

To prevent damage to radio 1, a plurality of elastomeric blocks 34, such as four, are bonded to the interior of housing 13. Blocks 34 have bonded threaded studs which are used to shock mount radio circuit board 33. Circuit board 33 is treated with a conformal coating such as acrylic or paralyene to improve its moisture resistance.

All removable elements that penetrate or mount to housing 13 or back panel 20 are sealed watertight with appropriate gaskets or sealant. "Formed-in-place" gaskets 36 are shown around the back edge of housing 13 to seal cover 20. Another such gasket 37 is shown on the surface of charger housing 30 to seal opening 21 in back cover 20.

Figure 4:
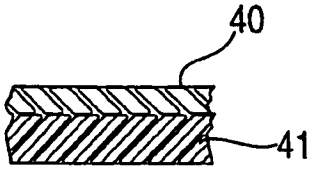
FIG. 4 is a cross section of the housing material of the radio as in FIG. 1.

The preferred housing material is a layer of ABS (acrylonitrile butadiene styrene) covered by a layer of polyurethane of approximately 50 durometers as a superbly impact resistant outer material. FIG. 4 shows this combination in cross section where 41 is the layer of ABS and 40 is the layer of polyurethane. Other combinations are also applicable as long as the rigid plastic is quite impact resistant and the outer covering is a resilient tough elastomer.

Figure 5:
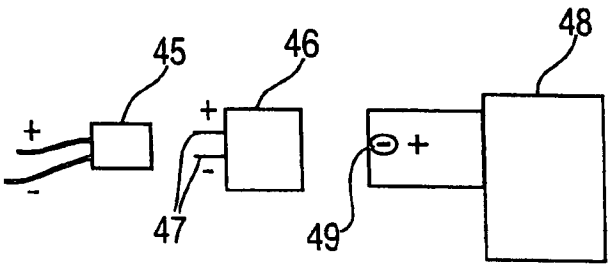
FIG. 5 is an exploded view of a power socket, adapter and modular battery of the radio as in FIG. 1.

Modern battery operated professional power tools use battery packs ranging from 9.6 to 18 volts. By selecting a 12 volt battery pack for the radio 1, an automotive AM/FM radio circuit board and display (augmented with a weather receiver) can be used with little modification. These come with powerful audio amplifier output stages and digital lighted displays. It is desirable to use a battery pack that is also used in other tools owned by the tradesman, or is at least the same brand. However, battery packs from different manufacturers, even of the same voltage ratings, have different contact configurations. For example, the Porter Cable 8500 battery pack is different from the DeWalt DW9071 even though both have similar ratings. For this purpose, FIG. 5 shows the arrangement using a standard socket 45 attached to the radio 1, with a replaceable adapter 46 which mates properly with both socket 45 at one end and a particular 12 volt battery pack 48 with its contacts 49. A variety of these adapters 46 are available for use.

Figure 6:
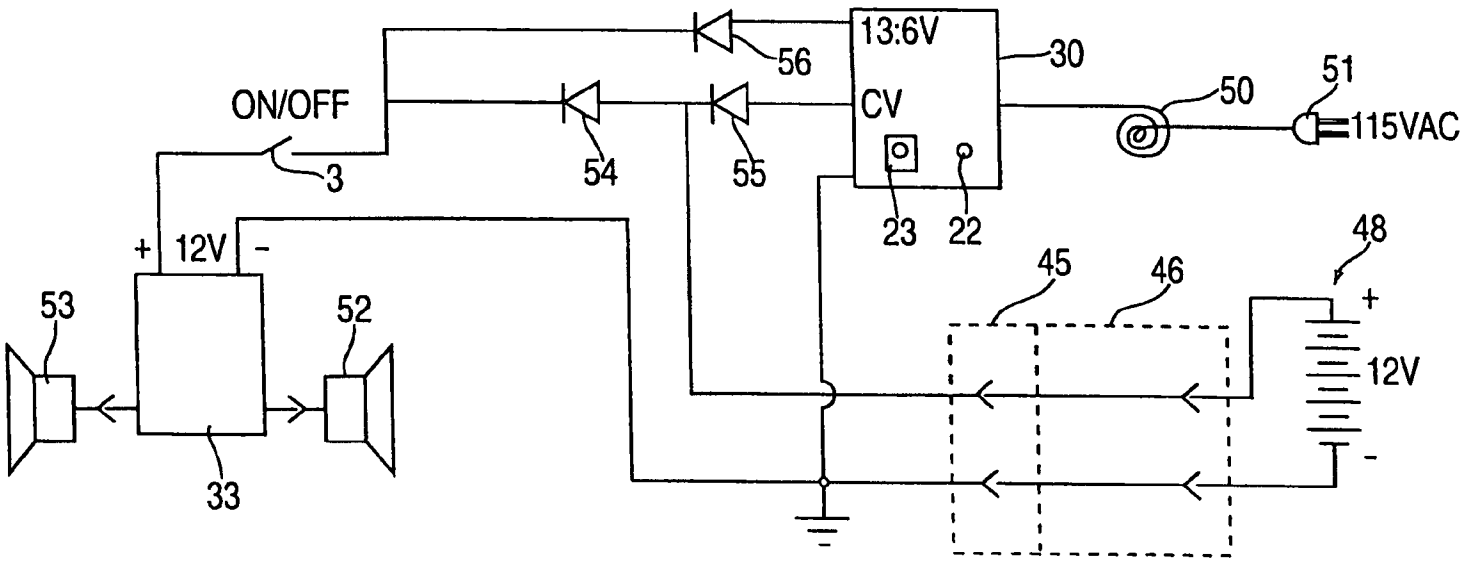
FIG. 6 is a schematic block diagram of the radio as in FIG. 1.
Figure 7:
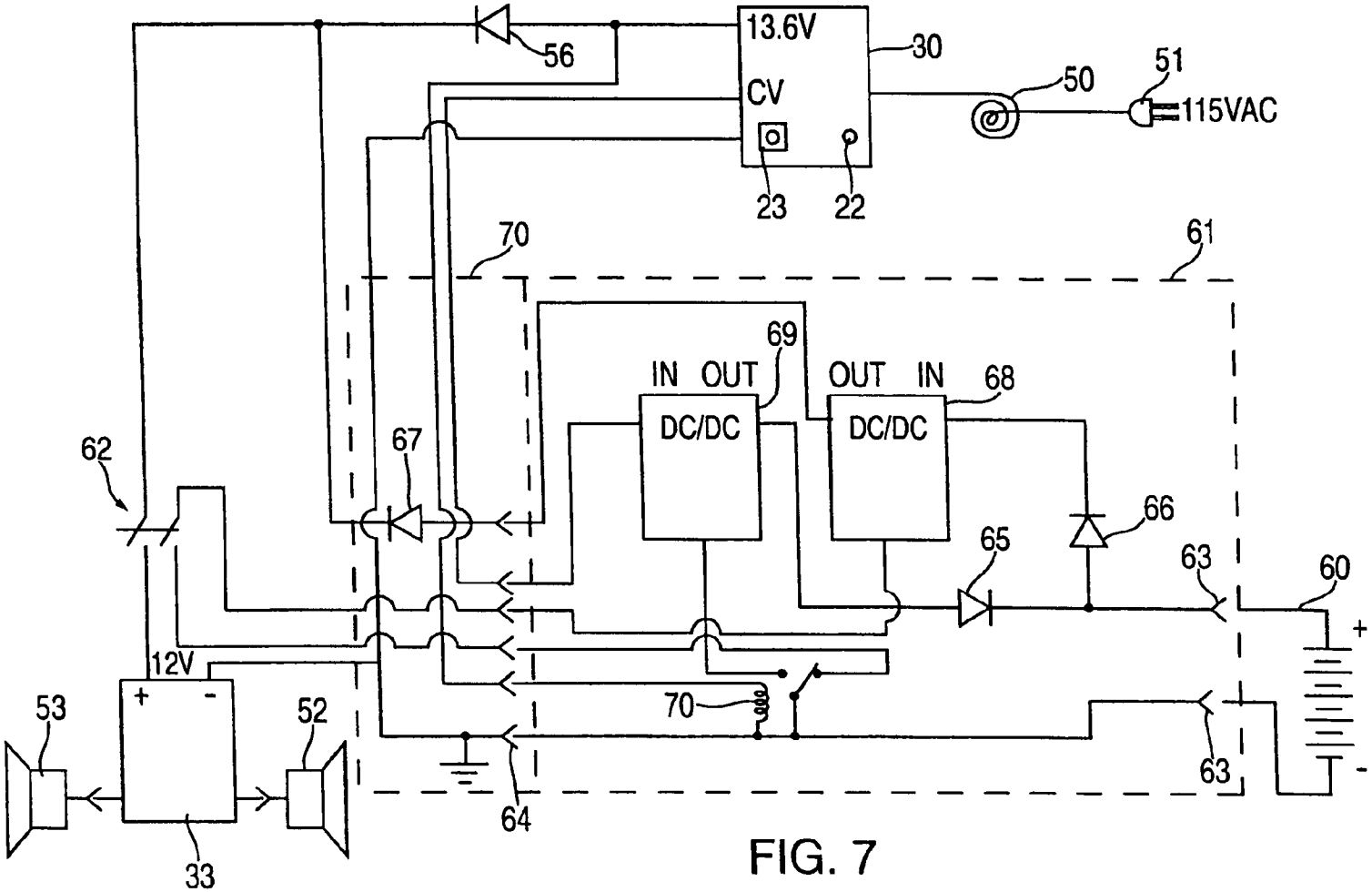
FIG. 7 is a schematic of an alternate embodiment of the radio of the present invention.

FIG. 6 shows a schematic block diagram of the electrical system. A combination power supply and battery charger 30 is supplied with 115 VAC via plug 51 and retractable cord 50. It supplies approximately 13.6 volts through silicon diode 56 to the radio electronics circuit board 33 through on/off switch 3. When button 23 is engaged, appropriate charge voltage is supplied to battery pack 48 through diode 55. Diode 54 feeds current from battery 48 to circuit 33 in the event that module 30 is not plugged into an outlet. The three diodes (54,55 and 56) act as an automatic steering and isolation network to supply AC supplied current to operate radio 1, battery power to the radio 1, or to simultaneously power and charge the batteries from AC. In all cases, a nominal 12 volts (i.e. 12 to 13.2 volts), is supplied to radio circuit board 33, which powers loudspeakers 52 and 53.

In an alternate embodiment, additional circuitry is provided to permit the use of battery packs lower or higher than 12 volts to be used in radio 1. In this embodiment, socket 45 is replaced with socket 70 which now has six contacts mating with adapter 61, which match the requirements of a particular battery pack 60. The on/off switch is now upgraded to a double pole single throw variety for controlling output DC/DC converter 68 for battery operation of radio 1. This extra pair of contacts eliminate the "standby" losses of converter 68 when radio 1 is turned off.

Charging DC/DC converter 69 is selected via relay 70 when the charger is turned on. Although electromagnetic relay 70 is shown, a solid state relay can be used instead. If battery pack 60 has a voltage rating higher than 12 volts (e.g. 18 volts), the output converter 68 is a step down type reducing the battery voltage to a nominal 12 volts while charge converter 69 is a step up converting a nominal 12 volts from the charger to a nominal 18 volts at the battery. If the battery voltage were lower than 12 volts (e.g. 9.6 volts), the output converter 68 is a step up type while the charging converter 69 is a step down type. Diodes 56 and 67 are used for power steering while diodes 66 and 65 are used for DC/DC converter isolation.

To accommodate a variety of different battery packs and adapters, the battery compartment is generously oversize and lined with a soft polyurethane material to protect the battery pack from damage.

It is further known that other modifications may be made to the rugged tradesworker's radio of the present invention, without departing from the scope of the invention, as noted in the appended claims.

I claim:

[1. An apparatus comprising:
a housing;
a charger disposed within the housing;
a receptacle in the charger;
a battery pack, detachably connectable to a power tool, mounted in the receptacle;
an audio circuit disposed within the housing for producing an audio signal comprising audio unrelated to the charger;
a first electrical circuit for charging the battery pack and for powering the audio circuit; and
a cable connector for connecting the first electrical circuit to an AC power source.]

[2. The apparatus of claim 1 wherein the apparatus further comprising a second electrical circuit connectable to the battery pack for powering the audio circuit when the connector is disconnected from the AC power source.]

[3. The apparatus of claim 1, wherein the audio circuit is a radio circuit.]

[4. An apparatus comprising:
a housing;
a charger disposed within the housing for charging a power tool battery pack detachably connectable to a power tool;
an audio circuit disposed within the housing for producing an audio signal comprising audio unrelated to the charger;
a power supply circuit disposed within the housing for providing power to at least one of the charger and the audio circuit; and
a cable connector for connecting the power supply circuit to an AC power source.]

[5. The apparatus of claim 4, further comprising an electrical circuit connectable to the battery pack for powering the audio circuit when the connector is disconnected from the AC power source.]

[6. The apparatus of claim 4, wherein the audio circuit is a radio circuit.]

[7. A method for charging a power tool battery pack comprising:
providing an audio equipment component having a housing, a power supply disposed within the housing, a charger disposed within the housing, an audio circuit disposed within the housing for producing an audio signal comprising audio unrelated to the charger, the audio circuit being connected to the power supply;
connecting the power supply to an AC power source via a cable;
connecting the charger to the power supply;
connecting the battery pack to the charger;
providing power to the battery pack; and
disconnecting the battery pack from the charger.]

[8. The method of claim 7, further comprising inserting the battery pack into a power tool.]

[9. The method of claim 7, further comprising providing power to the audio circuit while providing power to the battery pack.]

[10. The method of claim 7, further comprising manually switching the power supply to provide power to the audio circuit from the battery pack.]

[11. The method of claim 7, wherein the audio circuit is a radio circuit.]

[12. An apparatus comprising:
a housing;
an audio circuit for producing an audio signal disposed in the housing;
a charger disposed in the housing;
a receptacle in the charger;
a battery pack detachably connectable in a power tool mounted in the receptacle;
a first electrical circuit in the charger for charging the battery pack and for powering the audio circuit; and
a cable connector for connecting the first electrical circuit to an AC power source.]

[13. The apparatus of claim 12 wherein the apparatus further comprising a second electrical circuit connectable to the battery pack for powering the audio circuit when the connector is disconnected from the AC power source.]

[14. The apparatus of claim 12, wherein the audio circuit is a radio circuit.]

[15. A method for charging a power tool battery pack comprising:
providing an audio equipment component having a power supply, a circuit for producing an audio signal connected to the power supply and a charger connected to the power supply;
disposing the battery pack in the charger;
connecting the power supply to an AC power source via a cable;
providing power to the battery pack; and
removing the battery pack from the charger.]

[16. The method of claim 15, further comprising inserting the battery pack into a power tool.]

[17. The method of claim 15, further comprising providing power to the audio signal circuit while providing power to the battery pack.]

[18. The method of claim 15, further comprising manually switching the power supply to provide power to the audio signal circuit from the battery pack.]

[19. An apparatus comprising:
a charger electrically connectable to an AC power source;
a battery pack, detachably connectable to a power tool, connectable to the charger; and an audio circuit electrically connected to at least one of the battery pack and the charger for producing an audio signal comprising audio unrelated to the charger, the audio circuit being powerable by at least one of the battery pack and the AC power source.]

[20. The apparatus of claim 19 further comprising a housing for enclosing the audio circuit.]

[21. The apparatus of claim 19 further comprising a housing for enclosing the charger.]

[22. The apparatus of claim 19, further comprising a power supply circuit electrically connecting the audio circuit to the AC power source.]

[23. The apparatus of claim 19, wherein the audio circuit is a radio circuit.]

*24. An apparatus comprising:*

*a housing;*

*a charger disposed within the housing;*

*a receptacle in the charger;*

*a battery pack, detachably connectable to a power tool, and mounted in the receptacle, said battery pack having at least two external terminals for electrical connection to the battery pack, said battery pack further providing a DC supply voltage across said two external terminals at a first nominal DC voltage;*

*an audio circuit disposed within the housing for producing an audio signal comprising audio unrelated to the charger, said audio circuit being designed to be powered by a DC supply signal having a second nominal DC voltage different from said first nominal DC voltage;*

*a first electrical circuit for charging the battery pack by providing a charge current to said two external terminals at said first nominal DC voltage and for powering the audio circuit at said second nominal DC voltage; and*

*a cable connector for connecting the first electrical circuit to an AC power source.*

*25. The apparatus of claim 24 wherein the apparatus further comprising a second electrical circuit connectable to the battery pack for powering the audio circuit when the connector is disconnected from the AC power source.*

*26. The apparatus of claim 24, wherein the audio circuit is a radio circuit.*

*27. The apparatus of claim 24 wherein said first nominal DC voltage is substantially greater than said second nominal DC voltage.*

*28. An apparatus comprising:*

*a housing;*

*a charger disposed within the housing for charging a power tool battery pack detachably connectable to a power tool, said battery pack having at least two external terminals for electrical connection to the battery pack, said battery pack further providing a DC supply voltage across said two external terminals at a first nominal DC voltage;*

*an audio circuit disposed within the housing for producing an audio signal comprising audio unrelated to the charger, said audio circuit being designed to be powered by a supply signal having a second nominal DC voltage different from said first nominal DC voltage;*

*a first electrical circuit for charging the battery pack by providing a charge current to said two external terminals at said first nominal DC voltage;*

*a second electrical circuit for powering said audio circuit at said second nominal DC voltage;*

*a power supply circuit disposed within the housing for providing power to both of said first and second electrical circuits; and*

*a cable connector for connecting the power supply circuit to an AC power source.*

*29. The apparatus of claim 28, further comprising a third electrical circuit connectable to the battery pack for powering the audio circuit at said second nominal DC voltage when the cable connector is disconnected from the AC power source.*

*30. The apparatus of claim 28, wherein the audio circuit is a radio circuit.*

*31. The apparatus of claim 28 wherein said first nominal DC voltage is substantially greater than said second nominal DC voltage.*

*32. A method for charging a power tool battery pack having at least two external terminals for electrical connection to the battery pack, said battery pack further providing a DC supply voltage across said two external terminals at a first DC nominal voltage, the method comprising:*

*providing an audio equipment component having a housing, a power supply disposed within the housing, a charger disposed within the housing, the charger comprising a charging circuit for charging a battery pack by providing a charge current to said two external terminals at said first nominal DC voltage, an audio circuit disposed within the housing for producing an audio signal comprising audio unrelated to the charger, the audio circuit being connected to the power supply and configured to be powered by a supply signal having a second nominal DC voltage different from said first DC nominal voltage;*

*connecting the power supply to an AC power source via a cable;*

*connecting the charger to the power supply;*

*connecting the battery pack to the charger via said two external terminals;*

*providing charge current to the battery pack at said first nominal DC voltage; and*

*disconnecting the battery pack from the charger.*

*33. The method of claim 32, further comprising inserting the battery pack into a power tool.*

*34. The method of claim 32, further comprising providing power to the audio circuit while providing power to the battery pack.*

*35. The method of claim 32, further comprising manually switching the power supply to provide power to the audio circuit from the battery pack.*

*36. The method of claim 32, wherein the audio circuit is a radio circuit.*

*37. The method of claim 32 wherein said first nominal DC voltage is substantially greater than said second nominal DC voltage.*

*38. An apparatus comprising:*

*a housing;*

*a charger disposed in the housing;*

*a receptacle in the charger;*

*a battery pack, detachably connectable to a power tool, and mounted in the receptacle, said battery pack having at least two external terminals for electrical connection to the battery pack, said battery pack further providing a DC supply voltage across said two external terminals at a first nominal DC voltage;*

*an audio circuit for producing an audio signal disposed in the housing, said audio circuit being configured to be powered by a supply signal having a second nominal DC voltage different from said first nominal DC voltage;*

*a first electrical circuit in the charger for charging the battery pack by providing a charge current to said two external terminals at said first nominal DC voltage, and*

*a second electrical circuit for powering the audio circuit at said second nominal DC voltage; and*

*a cable connector and power supply for connecting the first electrical circuit and the second electrical circuit to an AC power source.*

*39. The apparatus of claim 38 wherein the apparatus further comprising a third electrical circuit connectable to the battery pack for powering the audio circuit at said second nominal DC voltage when the cable connector is disconnected from the AC power source.*

*40. The apparatus of claim 39 wherein said first nominal DC voltage is substantially greater than said second nominal DC voltage.*

*41. The apparatus of claim 38, wherein the audio circuit is a radio circuit.*

*42. A method for charging a power tool battery pack having at least two external terminals for electrical connection to the battery pack, said battery pack further providing a DC supply voltage across said two external terminals at a first nominal DC voltage, the method comprising:*

*providing an audio equipment component having a power supply, an audio circuit for producing an audio signal connected to the power supply, the audio circuit being configured to be powered by a supply signal having a second nominal DC voltage different from said first nominal DC voltage, and a charger connected to the power supply, the charger having a charging circuit for charging a battery pack by providing a charge current at said first nominal DC voltage;*

*disposing the battery pack in the charger so as to connect the battery pack via said two external terminals to said charging circuit;*

*connecting the power supply to an AC power source via a cable;*

*providing charge current to the battery pack at said first nominal DC voltage; and*

*removing the battery pack from the charger.*

*43. The method of claim 42, further comprising inserting the battery pack into a power tool.*

*44. The method of claim 42, further comprising providing power to the audio signal circuit while providing power to the battery pack.*

*45. The method of claim 42, further comprising manually switching the power supply to provide power to the audio signal circuit from the battery pack.*

*46. The method of claim 42 wherein said first nominal DC voltage is substantially greater than said second nominal DC voltage.*

*47. An apparatus comprising:*

*a charger electrically connectable to an AC power source, the charger having a first circuit for providing charging current at a first nominal DC voltage and a second circuit for providing a supply signal at a second nominal DC voltage different from said first nominal DC voltage;*

*a battery pack having at least two external terminals for electrical connection to the battery pack, said battery pack further providing a DC supply voltage across said two external terminals at said first nominal DC voltage, the battery pack being detachably connectable to a power tool and connectable to the charger via said two external terminals; and*

*an audio circuit electrically connected to at least one of the AC power source, the battery pack and the charger for producing an audio signal comprising audio unrelated to the charger, the audio circuit being configured to be powered by a supply signal at said second nominal DC voltage and selectively powerable by at least one of the battery pack and the AC power source.*

*48. The apparatus of claim 47 further comprising a housing for enclosing the audio circuit.*

*49. The apparatus of claim 47 further comprising a housing for enclosing the charger.*

*50. The apparatus of claim 47, further comprising a power supply circuit electrically connecting the audio circuit to the AC power source.*

*51. The apparatus of claim 47, wherein the audio circuit is a radio circuit.*

*52. The apparatus of claim 47 wherein said first nominal DC voltage is substantially greater than said second nominal DC voltage.*

* * * * *